United States Patent
Bayo Molla

(10) Patent No.: US 7,866,069 B2
(45) Date of Patent: Jan. 11, 2011

(54) CONVEYOR AND SUCTION BAND FOR INDUSTRIAL DRYING, IRONING AND FOLDING MACHINES AND PRODUCTION METHOD THEREOF

(75) Inventor: Jacinto Bayo Molla, Sabadell (ES)

(73) Assignee: Maria-Dolores Serra Teixido, Sabadell (ES)

( * ) Notice: Subject to any disclaimer, the term of this patent is extended or adjusted under 35 U.S.C. 154(b) by 723 days.

(21) Appl. No.: 11/814,241

(22) PCT Filed: Jan. 27, 2005

(86) PCT No.: PCT/ES2005/000033

§ 371 (c)(1),
(2), (4) Date: Jul. 18, 2007

(87) PCT Pub. No.: WO2006/079667

PCT Pub. Date: Aug. 3, 2006

(65) Prior Publication Data

US 2008/0201998 A1  Aug. 28, 2008

(51) Int. Cl.
*D06F 69/02* (2006.01)
*B65G 15/34* (2006.01)

(52) U.S. Cl. .......................... 38/8; 198/847

(58) Field of Classification Search ............... 38/8; 34/523, 658–663, 500, 507; 66/195; 156/137; 474/266, 268; 198/619, 688.1, 689.1, 804, 198/844.1–853; 442/189; 162/348, 351, 162/358.2
See application file for complete search history.

(56) References Cited

U.S. PATENT DOCUMENTS

| | | | |
|---|---|---|---|
| 2,379,788 A | 7/1945 | Clark | |
| 3,871,946 A * | 3/1975 | Romanski et al. | 474/268 |
| 4,140,485 A * | 2/1979 | Silverman | 432/239 |
| 4,377,045 A | 3/1983 | Aurensan | |
| 4,443,185 A * | 4/1984 | Smith | 432/59 |
| 4,635,788 A * | 1/1987 | McDonald | 198/848 |
| 5,383,828 A | 1/1995 | Sands et al. | |
| 6,000,532 A * | 12/1999 | Eckhardt | 198/847 |
| 7,007,349 B2 * | 3/2006 | Musil et al. | 24/37 |
| 7,523,626 B2 * | 4/2009 | Enzien et al. | 66/195 |
| 7,604,112 B1 * | 10/2009 | Lee | 198/831 |

FOREIGN PATENT DOCUMENTS

EP 0241176 10/1987

OTHER PUBLICATIONS

International Preliminary Report on Patentability dated May 4, 2006 for corresponding International Application PCT/ES2005/00033.
International Search Report dated May 18, 2005 for corresponding International Application PCT/ES2005/00033.

* cited by examiner

*Primary Examiner*—Ismael Izaguirre
(74) *Attorney, Agent, or Firm*—Katten Muchin Rosenman LLP

(57) ABSTRACT

The belt is of those which have a flat configuration and is closed by means of staples (6) or similar. Said belt comprises a mesh fabric (1), with warp (12) and weft (11), in which a plurality of holes (2) of size and determined density are defined, said fabric (1) being covered and thermofixed by a coating (3) of nonslip and temperature-resistant material. The weft (11) has some reinforced areas (4) alternating with some clearer areas (5), in which the weft (11) has a lower concentration of threads or fibres and, jointly with the warp (12), it defines the holes (2). The invention includes a method of manufacturing said belt (1).

4 Claims, 2 Drawing Sheets

CONVEYOR AND SUCTION BAND FOR INDUSTRIAL DRYING, IRONING AND FOLDING MACHINES AND PRODUCTION METHOD THEREOF

OBJECT OF THE INVENTION

The present invention refers to a transporting and suction belt for industrial drying, ironing and folding machines, of the type of those which have a flat configuration and whose ends are fastened to each other, said belts forming a closed loop or endless band for transport of the garments and clothes to be dried, ironed or folded, over the heating calenders of the machine. In the invention a method is included additionally for the production of said belt.

BACKGROUND OF THE INVENTION

In industrial drying, ironing and folding machines belts are used that have the mission of displacing the garments over the heated drums or calenders and subsequently through the folding areas.

At the present time, these belts are formed in a non-woven material, made of felt or similar, and they have a plurality of holes, defined in the belt by stamping or punching techniques. The purpose of these holes is to allow the application of a suction or depression to the garments or fabrics to be ironed, assuring their retention on the transporting belts.

The ends of these belts are usually secured by means of some metallic staples, said belts adopting a closed configuration by way of a loop or endless band.

These belts have a drawback in their manufacture, consisting in the need to make holes in the fabric constituting the belt, either by stamping or by punching, an operation which substantially increases the final price of the belts.

From a functional point of view, these belts made of felt or similar have the drawback that in their normal use they are subjected to tension, to the heat released by the heated rollers of the drying-ironing machine and to humidity, which causes their progressive stretching or lengthening.

This lengthening brings about that the belts, on becoming slack, slip on the moving transport rollers and work deficiently, it being necessary to proceed to their replacement in a relatively short time.

Also, as the belts are formed by non-woven fabrics, it is habitual that they fray and are quickly damaged due to the friction, which increases their premature ageing and the possibility of breaking.

DESCRIPTION OF THE INVENTION

The transporting belt of the present invention has constructional features intended to simplify its production and provide a high degree of resistance to tensile forces, to heat and to humidity, extending its useful life and the replacement time of the same considerably.

This transporting belt is of the type of those which are secured at their ends by means of staples or another means of coupling, forming a closed belt in form of a loop or endless band, intended to be mounted in the ironing machines to carry out the transfer or transport of the articles of clothing to be dried through the interior of the ironing machine.

In accordance with the invention, this belt is constituted by a fabric of thermofixed mesh and provided with a nonslip and heat-resistant coating.

Said mesh fabric, is a fabric comprising weft and warp, which has a plurality of holes defined during the production of said fabric in a loom or knitting machine.

With this structure of mesh fabric, the warp or longitudinal strands provide the belt with great tensile strength, which prevents the significant extension or stretching thereof during the normal operation in drying-ironing machines, whilst the weft or cross strands give consistency to the belt.

Furthermore, implementing the suction or low pressure holes during the production of the fabric obviates the later practicing of said holes by punching or stamping techniques, substantially reducing the manufacturing costs of the belt.

The fibres that can be used in the warp and the weft are varied, depending mainly on the working temperature that they have to bear. Thus, for high temperatures, such as up to 265° C. approximately, the most appropriate fibres can be: aramid or fibreglass fibres.

In turn, when the working temperature is lower, for example up to 120° C., other materials can be used, such as: cotton, polyester or wool.

The fibres of the weft and of the warp can be single strand or multiple strand, being obtained thereby a better texture and strength for the belt.

The belt is thermofixed by a coating of nonslip material which increases the inherent tensile strength of the mesh fabric, the general strength of the mesh and binds the fibres preventing the belt from fraying.

The belt can be rougher on one face than on the other, facilitating the grip on the rollers and/or traction sheaves. This extra roughness can be achieved by the application of the aforementioned coating in a convenient way to achieve this effect.

Likewise, depending on the working temperature of the machine for which it is intended, the coating can be formed by diverse materials. For example, to support working temperatures up to approximately 265° C., the following coating materials can be used: low-viscosity fluid silicones or solid polymers of silicone rubber.

For working temperatures up to 120° C., coating materials can be used, such as: natural rubbers, synthetic rubbers, acrylic resins, plastic resins or polymers of several types.

To facilitate the closing of the loop of the belt by means of staples, it has been foreseen that the weft can have reinforced areas along the belt, in which areas the concentration of threads or fibres is higher and suction holes are absent, said areas of reinforcement of the weft being alternated with clearer areas, where the concentration of threads or fibres of the weft is lower, the suction or low pressure holes of the fabric being implemented in said clearer areas.

The areas of reinforcement of the weft are especially suitable for the insertion of the closing staples since they have more body and prevent detachment of the staples by pulling of the strands or fibres of the weft.

The manufacture of said belt is very straightforward since it comprises:

- The manufacture of a piece of mesh fabric, with weft and warp, in a loom or knitting machine, the suction holes being defined in the fabric with the desired form, size and arrangement, as well as the areas of reinforcement of the weft, said fabric having the width allowed by the knitting machine,
- the thermofixing of the mesh fabric, by application of a coating of nonslip and heat-resistant material, this coating or covering being applied by immersion, by spray, or by means of a squeegee,
- the longitudinal cutting of the piece of thermofixed fabric into portions or strips of a variable width in accordance with the width of the belt it is desired to obtain,
- the cross cutting of the thermofixed belt to the desired length, so that the areas of reinforcement of the weft are at the ends of the belt and,
- the fastening of the opposing ends of the belt, by staples or other conventional means, to obtain a closed belt or endless band and so that the staples are fixed in the reinforced areas of the weft.

DESCRIPTION OF THE DRAWINGS

To complete the description being made and to assist in a better understanding of the characteristics of the invention, this descriptive specification is accompanied with a set of drawings wherein, by way of illustration but not restrictively, the following has been represented.

PREFERRED EMBODIMENT OF THE INVENTION

Figure 1:
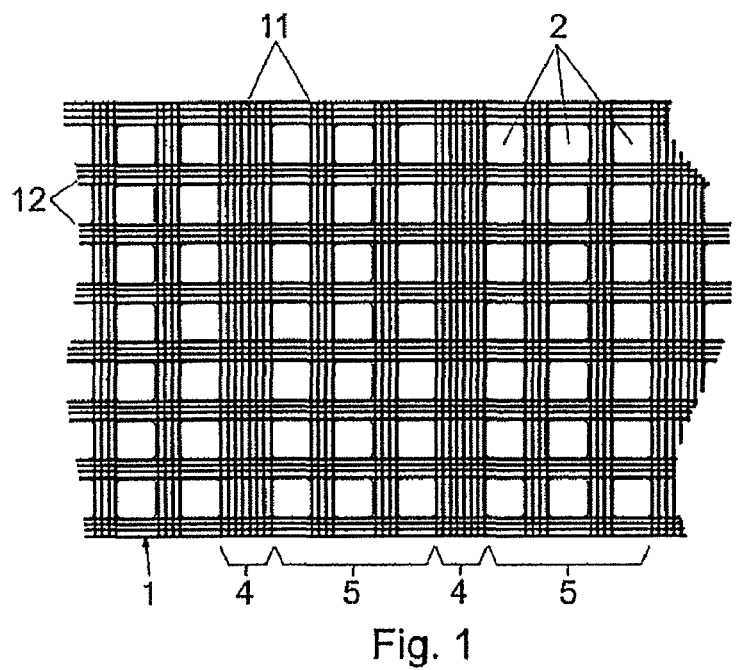
FIG. 1 shows a plan view of a belt fragment, showing the areas in which the weft is thicker and the areas in which the weft is less thick.
Figure 2:
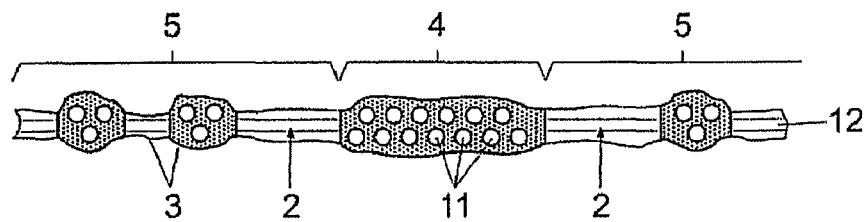
FIG. 2 shows a longitudinal section of the belt shown above.

As can be observed in the figures cited above, the transporting belt for ironing machines comprises a mesh fabric (1), with warp and weft, obtained by conventional techniques in a loom or knitting machine and formed from single or composite strands, in which a plurality of holes (2) are defined of size and determined density, said mesh fabric (1) being covered and thermofixed by a coating (3) of nonslip and temperature-resistant material.

The strands constituting the weft (11) and the warp (12) can be made of: aramid fibre, fibreglass fibre, polyester, wool or cotton among others, whilst the coating (3) can be silicone, polyurethane, natural or synthetic rubbers, polymers and others.

In a preferred embodiment the weft (11) has some reinforced areas (4), with a higher concentration of fibres or threads, alternating with some clearer areas (5) in which the weft (11) has a lower concentration of threads or fibres and, jointly with the warp (12) delimits the holes (2). Said holes can come in diverse forms and arrangements, being obtained in all cases during the manufacture of the mesh fabric in the knitting machine.

Figure 3:
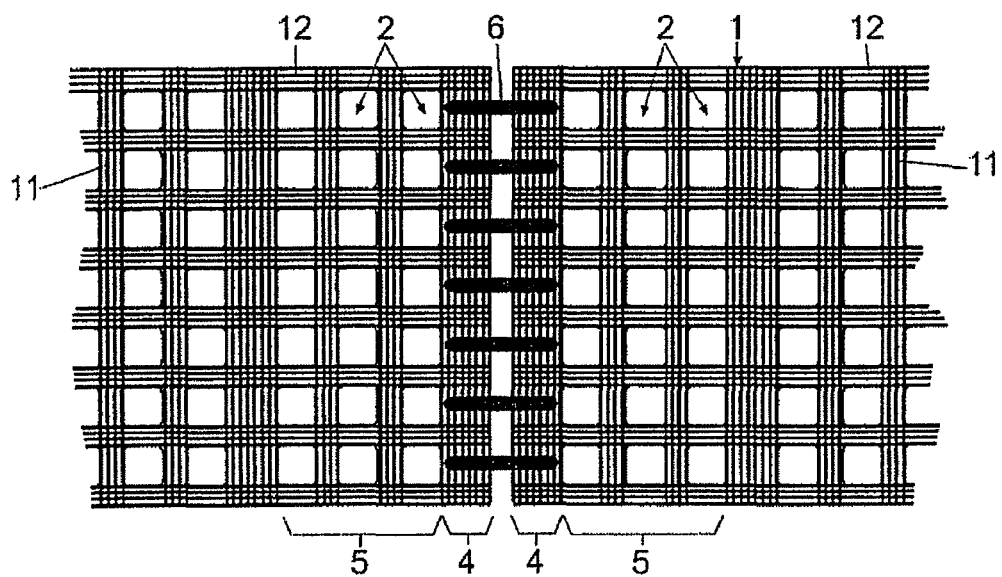
FIG. 3 shows a detail of the junction of the two ends of the belt by means of some staples which act on the reinforced areas of the weft.

As can be observed in the detail of FIG. 3, the fastening of the opposing ends of the belt (1), so that it adopts a closed configuration by way of an endless band, is carried out by means of some staples (6) which are fastened in the reinforced areas (4) of the weft (11), corresponding to the opposing ends of the belt (1), which prevents the staples (6) from tearing the weft (11) of the ends of the belt, when said belt (1) is subjected to a working tension.

In an alternative embodiment the belt (1) can have on one of its faces a greater texture or roughness, defined by coating or covering (3), to increase the frictional force on the transporting rollers of the drying-ironing machine and preventing it from slipping.

Figure 4:
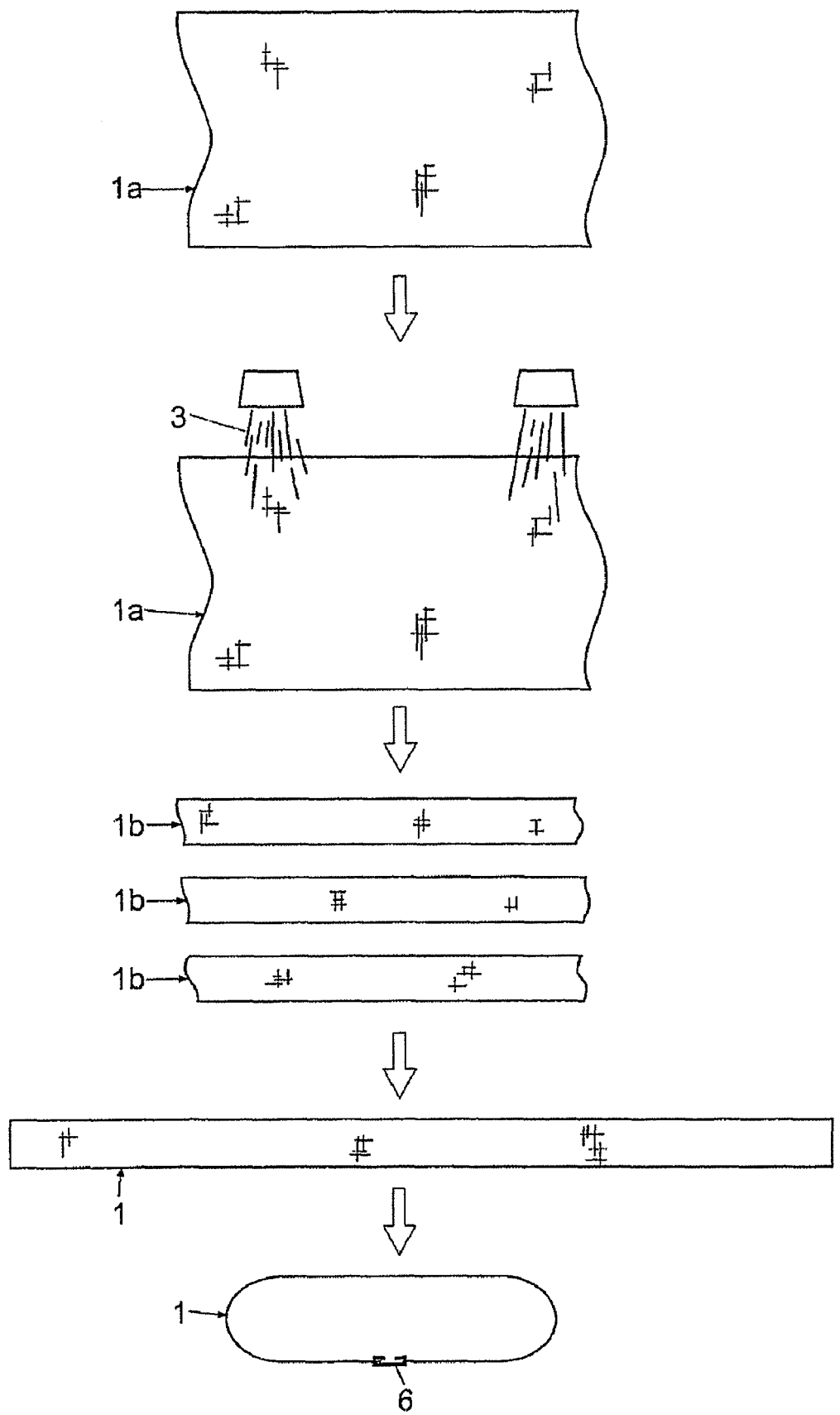
FIG. 4 shows a schematic view of the successive phases for obtaining the belt according to the method of the invention.

The method of manufacturing the belt (1) in accordance with the schematic shown in FIG. 4 comprises the following phases:

The fabrication of a piece (1a) of mesh fabric, with weft and warp, in a loom or knitting machine, and with the characteristics shown in FIG. 1, the thermofixing of the piece (1a) of mesh fabric, by application of a coating (3) of nonslip and heat-resistant material, by spraying, impregnation or immersion in said product for coating (3), the longitudinal cutting of the fabric piece (1a), once thermofixed, into portions or strips (1b) of the width desired in each case, the cross cutting of the strips (1b) of thermofixed mesh fabric to the desired length and so that the reinforced areas (4) of the weft are as much as possible in correspondence with the ends of the belt (1), as is shown in FIG. 3 and, the fastening of the opposing ends of the belt (1), by means of staples (6) which establish the linkage of the reinforced areas (4) at the ends of the belt (1).

Having sufficiently described the nature of the invention, as well as a preferred example of embodiment, it is mentioned for the opportune effects that the materials, form, size and arrangement of the elements described can be modified, provided it does not signify an alteration to the essential characteristics of the invention, which are claimed below.

The invention claimed is:

1. Transporting and suction belt for industrial drying, ironing and folding machines, having a flat configuration and the ends of which are fastened to each other by means of staples (6) or similar, adopting a closed configuration by way of a loop or endless band, characterized in that it comprises a mesh fabric (1), with warp (12) and weft (11), formed from single or composite strands, in which a plurality of holes (2) are defined of size and determined density, said mesh fabric (1) being covered and thermofixed by a coating (3) of nonslip and temperature-resistant material, and characterized in that the weft (11) has some reinforced areas (4), with a higher concentration of fibres or threads, alternating with some clearer areas (5), in which the weft (11) has a lower concentration of threads or fibres, and, jointly with the warp (12), it delimits the holes (2).

2. Belt, according to claim 1, characterized in that it has in correspondence with each of the opposing ends, reinforced areas (4) of the weft (11), said reinforced areas (4) forming the areas for inserting the staples (6) or fastening means.

3. Belt, according to claim 1, characterized in that the coating (3) and finish define on the opposing faces or sides of the belt different textures or roughness.

4. Method for manufacturing the belt of claim 1, characterized in that it comprises the following steps:
 a) the manufacture of a piece (1a) of mesh fabric, with weft (11) and warp (12), in a loom or knitting machine,
 b) the thermofixing of the piece (1a) of mesh fabric, by application of a coating (3) of nonslip and heat-resistant material,
 c) the longitudinal cutting of the fabric piece (1a), once thermofixed, in portions or strips (1b) of the width desired in each case,
 d) the cross cutting of the strips (1b) of thermofixed mesh fabric to the desired length and so that reinforced areas (4) of the weft are in correspondence with the opposing ends of the belt (1) and,
 e) the fastening of the opposing ends of the belt (1), by means of staples (6) or stitching, establishing the linkage of the reinforced areas (4) at the ends of the belt (1).

* * * * *